US007926040B2

(12) United States Patent
Aubertine et al.

(10) Patent No.: US 7,926,040 B2
(45) Date of Patent: Apr. 12, 2011

(54) METHOD AND SYSTEM FOR TIMING CODE EXECUTION IN A KORN SHELL SCRIPT

(75) Inventors: Matthew Edward Aubertine, Austin, TX (US); Rajat Tiwary, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1253 days.

(21) Appl. No.: 11/470,444

(22) Filed: Sep. 6, 2006

(65) Prior Publication Data

US 2008/0127067 A1    May 29, 2008

(51) Int. Cl.
*G06F 9/44* (2006.01)
(52) U.S. Cl. ......... 717/127; 717/115; 717/124; 717/128
(58) Field of Classification Search .................... 717/127
See application file for complete search history.

(56) References Cited

U.S. PATENT DOCUMENTS

| | | | | |
|---|---|---|---|---|
| 5,799,297 | A * | 8/1998 | Goodridge et al. | 1/1 |
| 5,805,884 | A * | 9/1998 | Sitbon et al. | 719/320 |
| 6,457,142 | B1 * | 9/2002 | Klemm et al. | 714/38 |
| 6,609,216 | B1 * | 8/2003 | Almy et al. | 714/25 |
| 6,708,324 | B1 * | 3/2004 | Solloway et al. | 717/124 |
| 6,904,424 | B1 * | 6/2005 | Gusler et al. | 1/1 |
| 6,959,262 | B2 * | 10/2005 | Curry, III | 702/183 |
| 7,310,777 | B2 * | 12/2007 | Cirne | 715/763 |
| 7,519,958 | B2 * | 4/2009 | Griep | 717/127 |
| 7,774,784 | B2 * | 8/2010 | Fields et al. | 718/104 |
| 2002/0199173 | A1 * | 12/2002 | Bowen | 717/129 |
| 2003/0131343 | A1 * | 7/2003 | French et al. | 717/127 |
| 2004/0103394 | A1 * | 5/2004 | Manda et al. | 717/126 |
| 2004/0168157 | A1 * | 8/2004 | Hundt et al. | 717/130 |
| 2004/0205455 | A1 * | 10/2004 | Dathathraya | 715/500 |
| 2007/0028217 | A1 * | 2/2007 | Mishra et al. | 717/124 |
| 2007/0061784 | A1 * | 3/2007 | Prakash et al. | 717/127 |
| 2008/0127105 | A1 * | 5/2008 | Finley et al. | 717/127 |

OTHER PUBLICATIONS

CA Harring, "Method for Counting Instructions Executed, Jan. 1979," TDB 01-79 p. 3257, www.delphion.com/tdbs/tdb?order=79A+00568.
HW Flanagan, "Program Monitoring Technique, Jan. 1971," TDB 01-71 p. 2399-2401, www.delphion.com/tdbs/tdb?order=71C+00417.
B Jensen, "Process Thread Control Procedure," TDB v38 n2 Feb. 1995 p. 237-238, www.delphion.com/tdbs/tdb?order=95A+60310.

* cited by examiner

*Primary Examiner* — Wei Y Zhen
*Assistant Examiner* — Matthew J Brophy
(74) *Attorney, Agent, or Firm* — Dillon & Yudell LLP

(57) ABSTRACT

A method, system, and computer program product for timing the execution of code to facilitate the debugging of a Korn shell script. A user specifies the starting point and stopping point of a block of code by placing a time-code function at the beginning and end of the block of code. Furthermore, the user specifies a threshold value within the time-code function that corresponds to a maximum amount of time allotted for execution. The user defines a label variable to identify the output. When the block of code is executed, the time-code function calculates the time of execution and outputs the results. If the code contains an error that causes the execution time to exceed the threshold value, the time-code function halts the execution of the block of code and an error message is displayed. The error message then assists the user in debugging the block of code.

20 Claims, 3 Drawing Sheets

METHOD AND SYSTEM FOR TIMING CODE EXECUTION IN A KORN SHELL SCRIPT

BACKGROUND OF THE INVENTION

1. Technical Field

The present invention relates in general to the field of computers and other data processing systems and in particular to scripting languages. Still more particularly, the present invention relates to an improved method and system for timing the execution of code.

2. Description of the Related Art

Computer languages fulfill various purposes and are suited to different styles of programming. A programming task, known as scripting, involves connecting diverse pre-existing components to facilitate the automation of simple tasks. Scripting languages (also referred to as batch languages) are computer programming languages created to shorten the conventional programming process. Since a script is typically interpreted rather than compiled, it is usually faster to program in a scripting language. Also, script files are typically much smaller than equivalent high-level programming language files.

An operating system usually offers some type of scripting language by default. This operating system (OS) scripting language is also known as a shell script language. Shell scripts use environment variables to (a) store temporary values for reference later in the script and also to (b) communicate data to other processes. A number of shell script languages exist (e.g., Bourne shell (BSH), Korn shell (KSH), and C shell (CSH)). Each of these shells is capable of executing blocks of code within a script. When debugging a conventional Korn shell script, a software developer must identify problem areas of code in which tasks fail to execute within an expected reasonable amount of time.

Currently, Korn shell developers may add code to a Korn shell script in order to calculate the execution time of a particular block of code. Execution time is typically calculated by capturing the time before and after the execution of a block of code and then subtracting the timestamps to determine the execution time. However, this conventional method may create infinite loops or cause the Korn shell developer to unnecessarily wait for a block of code that contains a hang condition to execute in its entirety. Conventional methods of calculating execution times are also inefficient, as the Korn shell developer must still manually locate any problematic areas of each block of code within a script. The present invention thus recognizes that an improved method and system for timing the execution of code to facilitate the debugging of a Korn shell script is needed.

SUMMARY OF THE INVENTION

Disclosed is a method, system, and computer program product for timing the execution of code to facilitate the debugging of a Korn shell script. A user, such as a Korn shell developer, specifies the starting point and stopping point of a block of code by placing a time-code function at the beginning and end of the block of code. Furthermore, the user specifies a threshold value within the time-code function that corresponds to a maximum amount of time allotted for the execution of the block of code. The user also defines a label variable to identify the block of code. When the block of code bounded by the user-specified starting and stopping points is executed, the time-code function calculates the time required for successful execution of the block of code and outputs the results to a data table stored in memory and viewable by the user. If the code contains an error that causes the execution time to exceed the threshold value, the time-code function halts the execution of the block of code and an error message is displayed. The error message then assists the user in debugging the block of code.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The present invention provides a method, system, and computer program product for timing the execution of code to facilitate the debugging of a Korn shell script.

Figure 1:
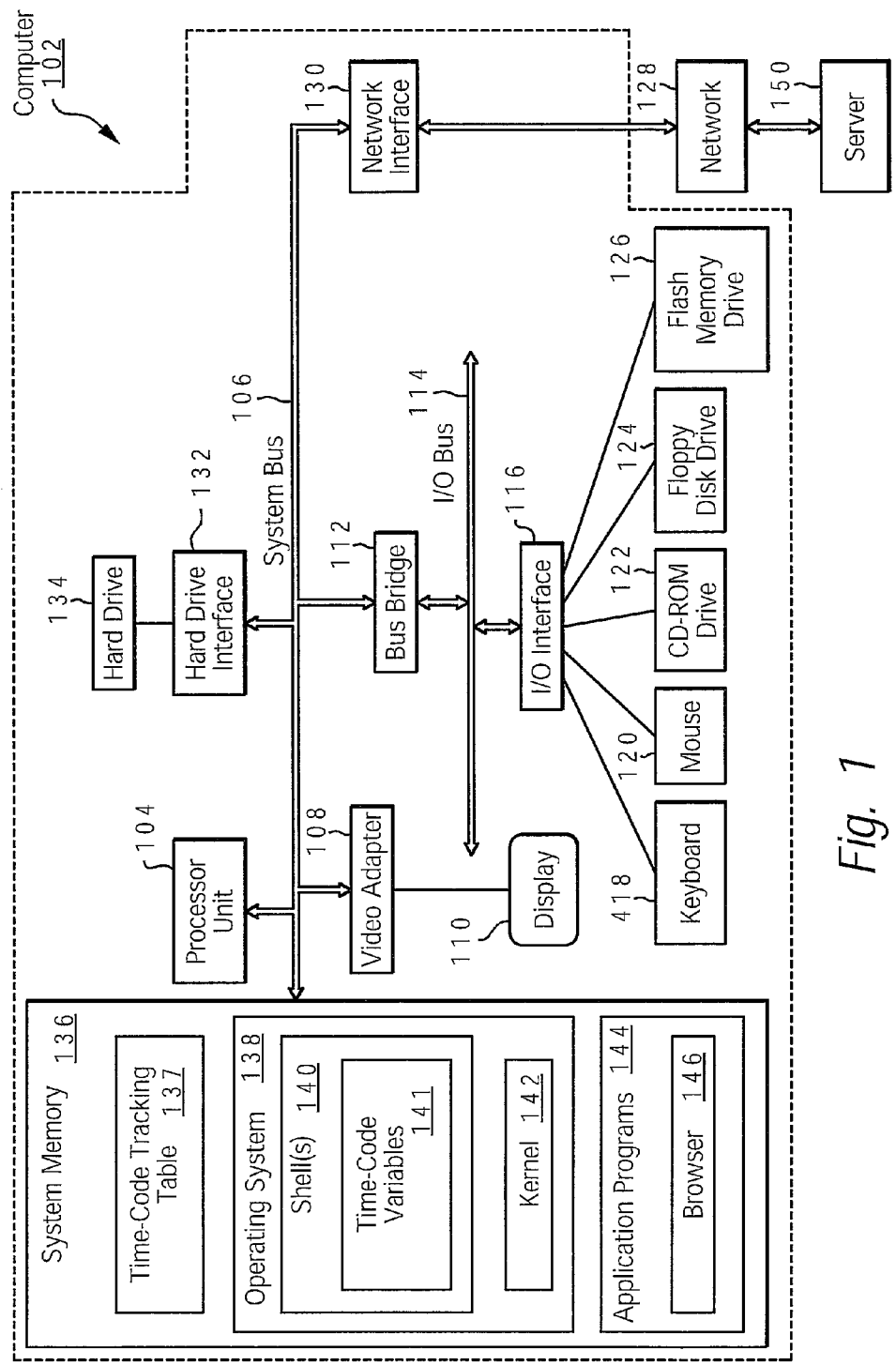
FIG. 1 depicts a high level block diagram of an exemplary data processing system, as utilized in an embodiment of the present invention.

With reference now to FIG. 1, there is depicted a block diagram of an exemplary computer 102, within which the present invention may be implemented. Computer 102 includes processor unit 104 that is coupled to system bus 106. Video adapter 108, which drives/supports display 110, is also coupled to system bus 106. System bus 106 is coupled via bus bridge 112 to Input/Output (I/O) bus 114. I/O interface 116 is coupled to I/O bus 114. I/O interface 116 affords communication with various I/O devices, including keyboard 118, mouse 120, Compact Disk-Read Only Memory (CD-ROM) drive 122, floppy disk drive 124, and flash drive memory 126. The format of the ports connected to I/O interface 116 may be any known to those skilled in the art of computer architecture, including but not limited to Universal Serial Bus (USB) ports.

Computer 102 is able to communicate with server 150 via network 128 using network interface 130, which is coupled to system bus 106. Network 128 may be an external network such as the Internet, or an internal network such as an Ethernet or a Virtual Private Network (VPN).

Hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory may include additional higher levels of volatile memory (not shown), including, but not limited to, cache memory, registers, and buffers. Code that populates system memory 136 includes time-code tracking table 137, operating system (OS) 138, and application programs 144.

OS 138 includes shell 140, for providing transparent user access to resources such as application programs 144. Generally, shell 140 (as it is called in UNIX®) is a program that provides an interpreter and an interface between the user and the operating system. More specifically, shell 140 executes commands that are entered into a command line user interface. Thus, shell 140, also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

Shell 140 may comprise one or more shell scripting languages, including, but not limited to: Korn Shell (KSH), Bourne Shell (BSH), and C Shell (CSH). As depicted, shell 140 also includes time-code variables 141, which may be utilized by the user of computer 102 to track the time required to execute a block of code within a KSH script in accordance with the present invention. OS 138 also includes kernel 142, which includes lower levels of functionality for OS 138. Kernel 142 provides essential services required by other parts of OS 138 and application programs 144. The services provided by kernel 142 include memory management, process and task management, disk management, and mouse and keyboard management.

Application programs 144 include browser 146. Browser 146 includes program modules and instructions enabling a World Wide Web (WWW) client (i.e., client computer 102) to send and receive network messages to the Internet. Computer 102 may utilize HyperText Transfer Protocol (HTTP) messaging to enable communication with server 150.

The hardware elements depicted in computer 102 are not intended to be exhaustive, but rather represent and/or highlight certain components that may be utilized to practice the present invention. For instance, computer 102 may include alternate memory storage devices such as magnetic cassettes, Digital Versatile Disks (DVDs), Bernoulli cartridges, and the like. These and other variations are intended to be within the spirit and scope of the present invention.

Figure 2:
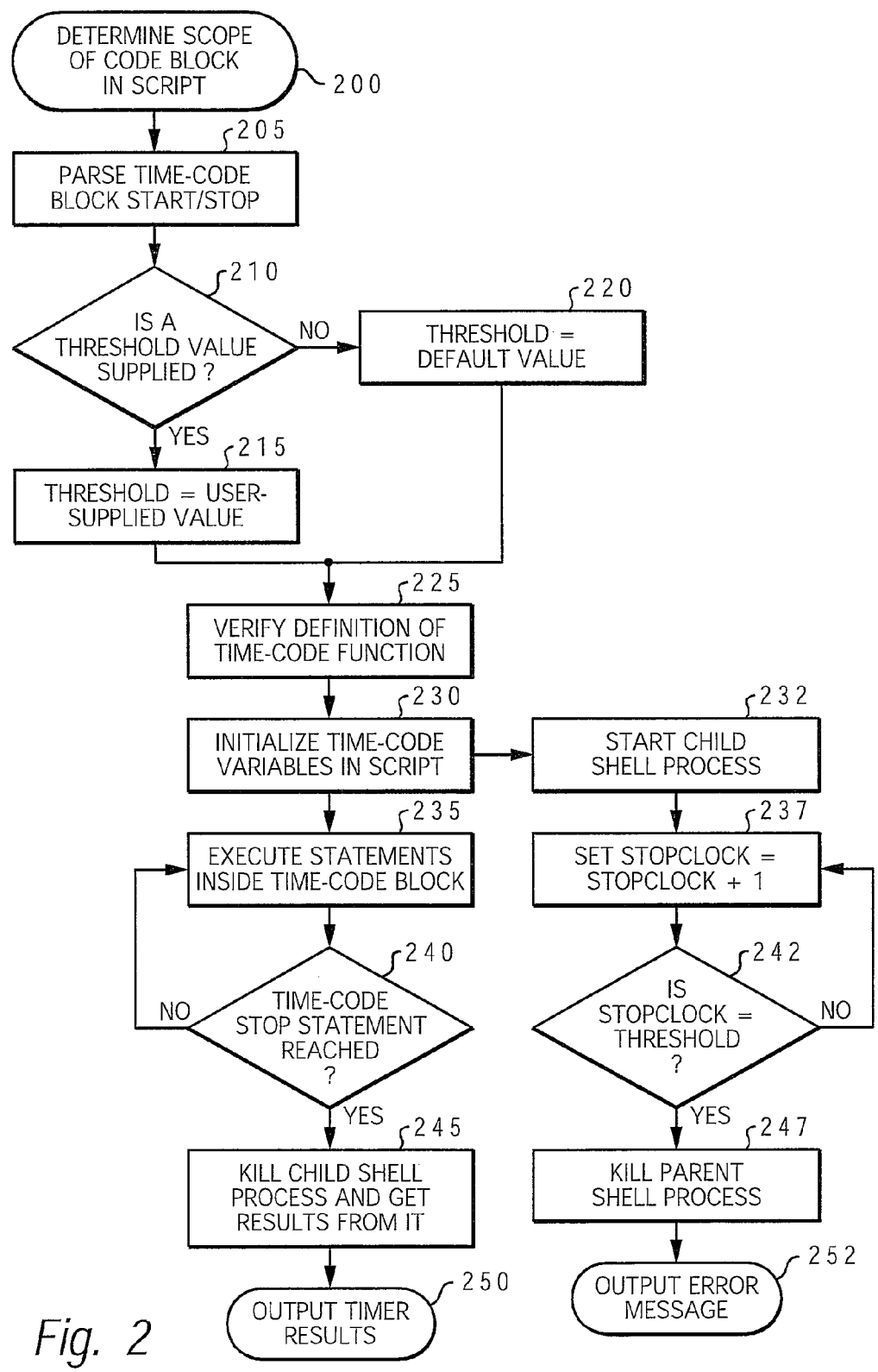
FIG. 2 is a high level logical flowchart of an exemplary method of timing the execution of code to facilitate the debugging of a Korn shell script in accordance with one embodiment of the invention.
Figure 3:
FIG. 3 depicts an exemplary time-code tracking table outputted in response to the execution of a plurality of time-code functions in accordance with an embodiment of the invention.

With reference now to FIG. 2, there is illustrated a high level logical flowchart of an exemplary method of timing the execution of code to facilitate the debugging of a Korn shell script in accordance with one embodiment of the invention. The process of timing the execution of a block of code may be implemented as a Korn shell extension that utilizes a script within shell 140 to create a time-code function. The time-code function is defined as a Korn shell script that utilizes a plurality of time-code variables 141 within shell 140 to measure the execution time of a code block specified by a user of computer 102. The time-code function then outputs the results to time-code tracking table 137, which is stored within system memory 136. An example of a time-code tracking table is illustrated in FIG. 3 and is discussed in detail below. In an alternate embodiment, time-code tracking table 137 may not be stored in system memory 136, but may instead be directly outputted to display 110, floppy disk drive 124, or flash memory drive 126. Time-code tracking table 137 may also be sent to server 150 via network 128.

In one embodiment, the time-code function comprises a plurality of time-code variables 141, including, but not limited to, a label variable, a starting point, a stopping point, and a threshold value. The time-code function may also include an error indicator variable. The threshold variable defines a time limit within which the block of code marked by the time-code function must execute. The label variable may be a user-defined variable, which is set to identify a specific function or block of code within a script.

According to the illustrative embodiment, a user of shell 140 may utilize the time-code function to measure the execution of a block of code one or more times, thereby producing one or more output rows having the same label variable in time-code tracking table 137. A user of shell 140 may also nest a plurality of time-code functions to measure the execution of separate blocks of code, thereby producing output rows having different label variables in time-code tracking table 137.

Returning now to FIG. 2, the process begins at block 200, where the Korn shell script determines the scope of a block of code (e.g. a function being tested/debugged) specified by the user. The scope of a block of code is defined as the placement of the user-specified block of code within the Korn shell script with respect to the starting point and stopping point specified by the user. At block 205, the time-code function parses the starting point and stopping point specified by the user, in order to ensure that when executing the script, shell 140 will recognize the boundaries that the user has set for the block of code.

A determination is made at block 210 whether a user of shell 140 has provided a value for the threshold variable. If the user has provided a value for the threshold variable, then the time-code function uses the threshold value defined by the user, as depicted at block 215. It the user has not provided a value for the threshold variable, the time-code function uses a pre-defined default threshold value (e.g. 20 seconds), as shown at block 220. At block 225, shell 140 verifies that the variables of the time-code function have been defined by the user, such that values having the correct data types corresponding to the label variable, starting point variable, stopping point variable, and threshold variable are stored within time-code variables 141.

At block 230, the time-code variables are initialized by capturing the current time from the system clock of computer 102 and storing the value in a temporary timer variable within system memory 136. At block 232, a new child process within shell 140 is initialized to start a count-down stop-clock. At the same time that the child process is executing, the first line within the block of code bounded by the time-code starting point and the time-code stopping point is executed by the parent process within shell 140, as depicted at block 235. At block 237 the time on the stop-clock is increased by 1 second. At block 242 the stop-clock value is compared with the threshold time value. If the stop-clock value is not equal to the threshold time value, the child process returns to block 237 and increments the stop-clock by 1 second. If the stop-clock value is equal to the threshold value, the child process kills the parent process, as shown at block 247. An error message is then stored by the child process in time-code tracking table 137 and/or output to display 110, as depicted at block 252.

A decision is made at block 240, during the main code execution by the parent process within shell 140, whether the time-code stopping point has been reached. If the time-code stopping point has not been reached, then the parent process keeps executing statements inside the code execution block of the script, as depicted at block 235. If a determination is made at block 240 that the current code execution statement contains the time-code stopping point, then the parent process obtains the stop-clock value and a timestamp from the child process before killing the child process, as shown at block 245. At block 250, the value of the actual execution time is stored in a location within time-code tracking table 137 corresponding to the execution time for the row of the label variable used to identify the block of code.

With reference now to FIG. 3, there is an example depicting how this invention facilitates the debugging of a Korn shell script. The values provided in time-code tracking table 300 is solely for illustration. Time-code tracking table 300 includes a plurality of columns, each of which corresponds to a plurality of time-code variables. Columns within time-code tracking table 300 include label variable, execution time and error message. As depicted in FIG. 3, time code tracking table 300 also includes columns for the start time and stop time of the execution of each block of code. In such an embodiment, the values of the system clock of computer 102 corresponding to the starting time and stopping time of the execution of blocks of code are stored in rows within execution tracking table 300.

Time code tracking table 300 depicts three serial executions of a block of code, which is designated as "ABC". In the illustrated example, the third row of time code tracking table 300 contains an error message because the third execution time for code block "ABC", which is designated by instance "3", exceeded the threshold time value. A user of computer 102 may thus utilize time code tracking table 300 to efficiently debug the block of code designated by name variable "ABC".

It is understood that the use herein of specific names are for example only and not meant to imply any limitations on the invention. The invention may thus be implemented with different nomenclature/terminology and associated functionality utilized to describe the above devices/utility, etc., without limitation.

While an illustrative embodiment of the present invention has been described in the context of a fully functional computer system with installed software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as thumb drives, floppy disks, hard drives, CD ROMs, DVDs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. In a computer system having an operating system (OS) and associated Korn Shell (KSH), a method comprising: initiating the execution of a user-specified block of code within the KSH; concurrently executing a secondary process within the KSH that activates a clock timer, wherein said secondary process generates a time-code function utilizing a Korn shell script, which utilizes a plurality of time-code variables to measure the execution time of the user-specified block of code, and wherein the secondary process provides a threshold maximum execution time (threshold time) within which execution of the block of code is to be completed; wherein said secondary process completes the functions of: when execution of a first line of code within the block of code is initiated, capturing a current time from a system clock of the computer system that changes time in set time intervals and recording the current time in a starting point variable within system memory; and dynamically terminating execution of the block of code when the execution time reaches the threshold time; and when the block of code completes executing before the clock timer reaches the threshold time: automatically stopping the clock timer; and outputting elapsed time on the clock timer indicating actual execution time for executing the block of code.

2. The method of claim 1, wherein said dynamically terminating comprises: comparing a time value of the clock timer each time interval against the threshold time; and when the time value is equal to the threshold time: automatically stopping the execution of the block of code; and outputting an error message indicating the block of code failed to execute within the threshold time; wherein an error message is generated for one of two conditions, including (a) execution time for code block exceeded the threshold time value; and (b) the block of code does not execute completely due to an actual error in code that terminates the code execution; and wherein the code automatically exists after the elapse time exceeds the threshold time even when a hang condition is encountered within the code.

3. The method of claim 2, further comprising: providing a user interface for receipt of user input parameters; receiving, via the user interface, user input of values for a plurality of variables for use within the secondary process, said variables including at least a label variable, a starting point, and a threshold time; wherein the threshold time variable defines a time limit within which the block of code marked by the time-code function must execute; wherein the label variable is a user-defined variable, which is set to identify a specific function or block of code within a script; parsing the starting point and stopping point received to enable the KSH to recognize boundaries set by the user for executing the block of code, whereby execution of said block of code is bounded by the time-code starting point and the time-code stopping point; and establishing a time-code stopping point, wherein when said time-code stopping point is not provided by the user, said time-code stopping point is generated using the starting point and the threshold time; determining whether the time-code stopping point has been reached; and when the time-code stopping point has not been reached, continuing to execute code within the block of code within the KSH until a final code is executed within the block of code or the time-code stopping point is reached.

4. The method of claim 3, further comprising: storing the values of the plurality of variables within a table; storing a value of the actual execution time in a location within the table corresponding to the execution time for the specific row of the label variable used to identify the block of code, updating the table with recorded times, such as start time, stop time, execution time, and one of the elapse time or the error message during said respective capturing, recording and outputting steps; outputting results of the time-code function to the table, wherein said table comprises a plurality of data including the label variable, start time and stop time of the execution of each block of code, execution time, and error message; storing the table within a system memory; and directly outputting the table to an output device when a request for output of the table is received.

5. The method of claim 1, further comprising: checking each execution code within the block of code for the time-code stopping point; and when a current code execution statement contains the time-code stopping point: obtaining a current system clock time as a timestamp from the secondary process; and automatically stopping the secondary process.

6. The method of claim 1, further comprising: concurrently executing multiple blocks of code in a nested format, wherein a second block executes as a nested subroutine within the first block; nesting a plurality of said secondary functions each associated with one of said multiple blocks of code, said plurality of secondary functions separately measuring the execution time of each of the multiple blocks of code; and subsequently outputting a separate sequence of output variables for each of said multiple blocks of code, wherein when outputted within the table said table provides multiple output rows, each having a label variables and a different set of associated variables from each of the plurality of secondary processes.

7. The method of claim 1, further comprising determining, via the KSH script, a scope of a block of code specified by the user, wherein the scope of the block of code is the placement of the user-specified block of code within the KSH script with respect to a starting point and a stopping point specified by the user.

8. The method of claim 1, further comprising: dynamically verifying that each variable of the time-code function has been defined by the user, wherein each variable is provided a value that comprises the correct data types corresponding to the plurality of variables; determining whether a threshold time is provided by a user for the threshold variable; when the threshold value has been provided by the user for the threshold variable, completing the determination of the stopping point with the threshold value; and when the threshold value has not been provided by the user for the threshold variable, assigning a pre-defined default threshold time for use by the secondary process.

9. A data processing system comprising: a processor; a memory coupled to the processor; an operating system having a Korn Shell (KSH); and program means for executing a block of code within the KSH, said means comprising means for: initiating the execution of a user-specified block of code within the KSH; concurrently executing a secondary process within the KSH that activates a clock timer, wherein said secondary process generates a time-code function utilizing a Korn shell script, which utilizes a plurality of time-code variables to measure the execution time of the user-specified block of code, and wherein the secondary process provides a threshold maximum execution time (threshold time) within which execution of the block of code is to be completed; wherein said secondary process completes the functions of: when execution of a first line of code within the block of code is initiated, capturing a current time from a system clock of the computer system that changes time in set time intervals and recording the current time in a starting point variable within system memory; and dynamically terminating execution of the block of code when the execution time reaches the threshold time; and checking each execution code within the block of code for a time-code stopping point; when a current code execution statement contains the time-code stopping point, such that the block of code completes executing before the clock timer reaches the threshold time: automatically stopping the secondary process and the clock timer; obtaining a current system clock time as a timestamp from the secondary process; and outputting elapsed time on the clock timer indicating actual execution time for executing the block of code.

10. The data processing system of claim 9, wherein said means for dynamically terminating comprises means for: comparing a time value of the clock timer each time interval against the threshold time; and when the time value is equal to the threshold time: automatically stopping the execution of the block of code; and outputting an error message indicating the block of code failed to execute within the threshold time; wherein an error message is generated for one of two conditions, including (a) execution time for code block exceeded the threshold time value; and (b) the block of code does not execute completely due to an actual error in code that terminates the code execution; and wherein the code automatically exists after the elapse time exceeds the threshold time even when a hang condition is encountered within the code.

11. The data processing system of claim 10, further comprising means for: providing a user interface for receipt of user input parameters; receiving, via the user interface, user input of values for a plurality of variables for use within the secondary process, said variables including at least a label variable, a starting point, and a threshold time; wherein the threshold time variable defines a time limit within which the block of code marked by the time-code function must execute; wherein the label variable is a user-defined variable, which is set to identify a specific function or block of code within a script; parsing the starting point and stopping point received to enable the KSH to recognize boundaries set by the user for executing the block of code, whereby execution of said block of code is bounded by the time-code starting point and the time-code stopping point; and establishing a time-code stopping point, wherein when said time-code stopping point is not provided by the user, said time-code stopping point is generated using the starting point and the threshold time; determining whether the time-code stopping point has been reached; and when the time-code stopping point has not been reached, continuing to execute code within the block of code within the KSH until a final code is executed within the block of code or the time-code stopping point is reached.

12. The data processing system of claim 11, further comprising means for: storing the values of the plurality of variables within a table; storing a value of the actual execution time in a location within the table corresponding to the execution time for the specific row of the label variable used to identify the block of code, updating the table with recorded times, such as start time, stop time, execution time, and one of the elapse time or the error message during said respective capturing, recording and outputting steps; outputting results of the time-code function to the table, wherein said table comprises a plurality of data including the label variable, start time and stop time of the execution of each block of code, execution time, and error message; storing the table within a system memory; and directly outputting the table to an output device when a request for output of the table is received.

13. The data processing system of claim 9, further comprising means for: concurrently executing multiple blocks of code in a nested format, wherein a second block executes as a nested subroutine within the first block; nesting a plurality of said secondary functions each associated with one of said multiple blocks of code, said plurality of secondary functions separately measuring the execution time of each of the multiple blocks of code; and subsequently outputting a separate sequence of output variables for each of said multiple blocks of code, wherein when outputted within the table said table provides multiple output rows, each having a label variables and a different set of associated variables from each of the plurality of secondary processes.

14. The data processing system of claim 9, further comprising means for: determining, via the KSH script, a scope of a block of code specified by the user, wherein the scope of the block of code is the placement of the user-specified block of code within the KSH script with respect to a starting point and a stopping point specified by the user; dynamically verifying that each variable of the time-code function has been defined by the user, wherein each variable is provided a value that comprises the correct data types corresponding to the plurality of variables; determining whether a threshold time is provided by a user for the threshold variable; when the threshold value has been provided by the user for the threshold variable, completing the determination of the stopping point with the threshold value; and when the threshold value has not been provided by the user for the threshold variable, assigning a pre-defined default threshold time for use by the secondary process.

15. A computer program product comprising: a recordable type medium; and program instructions on the computer readable medium, which when executed by a processor of a computer system with an operating system having a Korn Shell (KSH) provides the functions of: initiating the execution of a user-specified block of code within the KSH; concurrently executing a secondary process within the KSH that activates a clock timer, wherein said secondary process generates a time-code function utilizing a Korn shell script, which utilizes a plurality of time-code variables to measure the execution time of the user-specified block of code, and wherein the secondary process provides a threshold maximum execution time (threshold time) within which execution of the block of code is to be completed; wherein said secondary process completes the functions of: when execution of a first line of code within the block of code is initiated, capturing a current time from a system clock of the computer system that changes time in set time intervals and recording the current time in a starting point variable within system memory; and dynamically terminating execution of the block of code when the execution time reaches the threshold time; and checking each execution code within the block of code for a time-code stopping point; when a current code execution statement contains the time-code stopping point, such that the block of code completes executing before the clock timer reaches the threshold time: automatically stopping the secondary process and the clock timer; obtaining a current system clock time as a timestamp from the secondary process; and outputting elapsed time on the clock timer indicating actual execution time for executing the block of code.

16. The computer program product of claim 15, wherein said program code for dynamically terminating comprises instructions for: comparing a time value of the clock timer each time interval against the threshold time; and when the time value is equal to the threshold time: automatically stopping the execution of the block of code; and outputting an error message indicating the block of code failed to execute within the threshold time; wherein an error message is generated for one of two conditions, including (a) execution time for code block exceeded the threshold time value; and (b) the block of code does not execute completely due to an actual error in code that terminates the code execution; and wherein the code automatically exists after the elapse time exceeds the threshold time even when a hang condition is encountered within the code.

17. The computer program product of claim 16, further comprising program instructions for: providing a user interface for receipt of user input parameters; receiving, via the user interface, user input of values for a plurality of variables for use within the secondary process, said variables including at least a label variable, a starting point, and a threshold time; wherein the threshold time variable defines a time limit within which the block of code marked by the time-code function must execute; wherein the label variable is a user-defined variable, which is set to identify a specific function or block of code within a script; parsing the starting point and stopping point received to enable the KSH to recognize boundaries set by the user for executing the block of code, whereby execution of said block of code is bounded by the time-code starting point and the time-code stopping point; establishing a time-code stopping point, wherein when said time-code stopping point is not provided by the user, said time-code stopping point is generated using the starting point and the threshold time; determining whether the time-code stopping point has been reached; and when the time-code stopping point has not been reached, continuing to execute code within the block of code within the KSH until a final code is executed within the block of code or the time-code stopping point is reached.

18. The computer program product of claim 17, further comprising program instructions for: storing the values of the plurality of variables within a table; storing a value of the actual execution time in a location within the table corresponding to the execution time for the specific row of the label variable used to identify the block of code, updating the table with recorded times, such as start time, stop time, execution time, and one of the elapse time or the error message during said respective capturing, recording and outputting steps; outputting results of the time-code function to the table, wherein said table comprises a plurality of data including the label variable, start time and stop time of the execution of each block of code, execution time, and error message; storing the table within a system memory; and directly outputting the table to an output device when a request for output of the table is received.

19. The computer program product of claim 16, further comprising program instructions for: concurrently executing multiple blocks of code in a nested format, wherein a second block executes as a nested subroutine within the first block; nesting a plurality of said secondary functions each associated with one of said multiple blocks of code, said plurality of secondary functions separately measuring the execution time of each of the multiple blocks of code; and subsequently outputting a separate sequence of output variables for each of said multiple blocks of code, wherein when outputted within the table said table provides multiple output rows, each having a label variables and a different set of associated variables from each of the plurality of secondary processes.

20. The computer program product of claim 16, further comprising program instructions for: determining, via the KSH script, a scope of a block of code specified by the user, wherein the scope of the block of code is the placement of the user-specified block of code within the KSH script with respect to a starting point and a stopping point specified by the user; dynamically verifying that each variable of the time-code function has been defined by the user, wherein each variable is provided a value that comprises the correct data types corresponding to the plurality of variables; determining whether a threshold time is provided by a user for the threshold variable; when the threshold value has been provided by the user for the threshold variable, completing the determination of the stopping point with the threshold value; and when the threshold value has not been provided by the user for the threshold variable, assigning a pre-defined default threshold time for use by the secondary process.

* * * * *